(12) United States Patent
Otsuka

(10) Patent No.: US 7,218,677 B2
(45) Date of Patent: May 15, 2007

(54) VARIABLE-LENGTH ENCODING APPARATUS AND METHOD

(75) Inventor: Katsumi Otsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 695 days.

(21) Appl. No.: 10/443,960

(22) Filed: May 23, 2003

(65) Prior Publication Data
US 2004/0017855 A1 Jan. 29, 2004

(30) Foreign Application Priority Data
May 29, 2002 (JP) ............................ 2002-156005
Feb. 3, 2003 (JP) ............................ 2003-026298

(51) Int. Cl.
H04B 14/04 (2006.01)
H04L 27/06 (2006.01)
H03M 7/34 (2006.01)

(52) U.S. Cl. ..................... 375/253; 375/340; 341/51
(58) Field of Classification Search ........... 375/240.11, 375/240.12, 240.24, 340, 253, 240; 341/51, 341/67, 107
See application file for complete search history.

(56) References Cited

U.S. PATENT DOCUMENTS 4,809,067 A * 2/1989 Kikuchi et al. ........ 375/240.12
5,471,206 A * 11/1995 Allen et al. .................... 341/51
5,754,128 A * 5/1998 Kang .......................... 341/67
2002/0006172 A1* 1/2002 Molloy ....................... 375/340
2002/0090142 A1 7/2002 Igarashi et al. ............. 382/246
2002/0122599 A1 9/2002 Igarashi et al. ............. 382/239
2002/0154042 A1 10/2002 Igarashi et al. ............... 341/67
2002/0164080 A1 11/2002 Igarashi et al. ............. 382/233
2003/0058143 A1 3/2003 Chiba et al. .................. 341/67

* cited by examiner

*Primary Examiner*—Emmanuel Bayard
*Assistant Examiner*—Lawrence Williams
(74) *Attorney, Agent, or Firm*—Fitzpatrick, Cella, Harper & Scinto

(57) ABSTRACT

A variable-length encoding apparatus capable of encoding two data groups in parallel, and a method and computer program for the same. A first encoding unit and a second encoding unit execute variable-length encoding in parallel. In order to concatenate first variable-length encoding data output from the first encoding unit and second variable-length encoding data output from the second encoding unit, the second variable-length encoding data is shifted by the number of bits of the first variable-length encoding data.

6 Claims, 9 Drawing Sheets

FIG. 7

| CLOCK CYCLE | INPUT SYMBOL DATA RRRR/SSSS | INPUT ADDITIONAL BITS | OUTPUT VARIABLE-LENGTH ENCODED DATA | OUTPUT VARIABLE-LENGTH ENCODED DATA LENGTH |
|---|---|---|---|---|
| 1 | 0/2 | 01 | 0101 | 4 |
| 2 | 1/9 | 1111110101 | 1111111110001010111110101 | 25 |
| 3 | 0/A | 0011100011 | 1111111101000011100011 | 22 |

FIG. 8

| RRRR/SSSS | VARIABLE-LENGTH CODE WORD | RRRR/SSSS | VARIABLE-LENGTH CODE WORD | RRRR/SSSS | VARIABLE-LENGTH CODE WORD |
|---|---|---|---|---|---|
| EOB | 1010 | 1/1 | 1100 | 2/1 | 11100 |
| 0/1 | 00 | 1/2 | 11011 | 2/2 | 1111001 |
| 0/2 | 01 | 1/3 | 111001 | 2/3 | 111110111 |
| 0/3 | 100 | 1/4 | 111110110 | 2/4 | 111111110100 |
| 0/4 | 1011 | 1/5 | 1111110110 | 2/5 | 1111111110001001 |
| 0/5 | 11010 | 1/6 | 1111111110000100 | 2/6 | 1111111110001010 |
| 0/6 | 1111000 | 1/7 | 1111111110000101 | 2/7 | 1111111110001011 |
| 0/7 | 11111000 | 1/8 | 1111111110000110 | 2/8 | 1111111110001100 |
| 0/8 | 1111110110 | 1/9 | 1111111110000111 | 2/9 | 1111111110001101 |
| 0/9 | 1111111110000000 | 1/A | 1111111110001000 | 2/A | 1111111110001110 |
| 0/A | 1111111110000001 | | | | |

| RRRR/SSSS | VARIABLE-LENGTH CODE WORD |
|---|---|
| EOB | 1010 |
| ZRL | 11111111001 |

FIG. 9

| CLOCK CYCLE | VALID1 VALID2 | INPUT SYMBOL DATA RRRR/SSSS1 RRRR/SSSS2 | INPUT ADDITIONAL BITS ADDITIONAL BITS 1 ADDITIONAL BITS 2 | OUTPUT VARIABLE-LENGTH ENCODED DATA RRRR/SSSS1 RRRR/SSSS2 | OUTPUT VARIABLE-LENGTH ENCODED DATA LENGTH | NOT FULL SIGNAL | PUSH SIGNAL | PENDING SIGNAL |
|---|---|---|---|---|---|---|---|---|
| 1 | 1 1 | 0/2 1/9 | 01 111110101 | 0101111111111000011111110 101 | 29 | 1 | 1 | 0 |
| 2 | 1 0 | 0/A — | 0011100011 — | 111111110000001001100011 | 26 | 1 | 1 | 0 |
| 3 | 1 1 | 1/1 2/1 | 0 1 | — | 0 | 0 | 0 | 1 |
| 4 | 1 1 | 1/1 2/1 | 0 1 | 11000 - 111001 | 11 | 1 | 1 | 0 |
| 5 | 0 0 | — — | — — | — | 0 | 1 | 0 | 0 |
| 6 | 1 1 | ZRL 1/2 | — 01 | 1111111001-1101101 | 18 | 1 | 1 | 0 |
| 7 | 0 1 | — EOB | — — | 1010 | 4 | 1 | 1 | 0 |

VARIABLE-LENGTH ENCODING APPARATUS AND METHOD

FIELD OF THE INVENTION

This invention relates to a variable-length encoding apparatus and method.

BACKGROUND OF THE INVENTION

A method using an entropy encoding technique based upon variable-length encoding is well known as a technique for compressing and encoding still images and moving images. Such a technique is adopted in JPEG (Joint Photographic Experts Group) encoding and MPEG (Moving Picture Experts Group) encoding, which are international standards. The entropy encoding employed in these schemes generates symbol data by applying run-length encoding to values of data obtained by subjecting orthogonal transform coefficients to quantization processing, and then generates variable-length encoded data with regard to each item of symbol data. Many hardware implementations using Huffman coding tables as the variable-length codes employed in this entropy encoding technique have been proposed in recent years.

In MPEG encoding, variable-length code is adopted for, e.g., motion vectors as syntax for constructing header information, and proposals for implementing this by hardware have also been proposed just as in cases where Huffman code tables are used.

There has been an explosive increase in the size of image data handled by various image systems owing to improvements in the data transfer capacity of recent communication networks and the higher density of storage devices. In view of these circumstances, processors for compressive encoding also required to have both high image quality and the ability to perform compressive encoding at a high bit rate.

In compressive encoding at a high bit rate, however, the number of items of symbol data is much higher in comparison with compressive encoding at a low bit rate and it is difficult to perform compressive encoding at high speed in a variable-length encoder that relies upon the prior art. Even if a variable-length encoder is applied using the prior art, processing time lengthens as the bit rate rises and, hence, such an encoder is of little practical use.

If it is attempted to realize a variable-length encoder that supports a high bit rate through use of the prior art, the frequency of the operating clock must be increased, resulting in a major increase in power consumption.

In MPEG-4 encoding the standardization of which has recently been completed, a maximum of four items of motion-vector information are required for every macro block, and variable-length encoding is necessary in each of the horizontal and vertical directions. In consideration of this fact, it is necessary to perform variable-length encoding eight times for every macro block. A problem which arises is lengthening of processing time.

The present invention has been devised in view of these circumstances and its object is to perform variable-length encoding at higher speed.

SUMMARY OF THE INVENTION

According to one aspect of the present invention, the foregoing object is achieved by providing a variable-length encoding apparatus for applying variable-length encoding to a series of continuous data streams to be encoded, and generating overall code length, comprising:

a plurality of generating means, disposed in parallel in accordance with number of a plurality of items of data to be encoded that enter in parallel, for generating, by referring to variable-length encoding tables, variable-length encoded data that includes variable-length code words corresponding to the entered data to be encoded, as well as code lengths of the data generated; and concatenation means for successively concatenating one, two or more neighboring items of variable-length encoded data from the generating means and producing a variable-length encoded data stream and overall length thereof.

According to one aspect of the present invention, the foregoing object is achieved by providing a variable-length encoding method for applying variable-length encoding to a series of continuous data streams to be encoded, and generating overall code length, comprising:

a plurality of generating steps, disposed in parallel in accordance with number of a plurality of items of data to be encoded that enter in parallel, of generating, by referring to variable-length encoding tables, variable-length encoded data that includes variable-length code words corresponding to the entered data to be encoded, as well as code lengths of the data generated; and a concatenation step of successively concatenating one, two or more neighboring items of variable-length encoded data from the generating step and producing a variable-length encoded data stream and overall length thereof.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram illustrating operation for every clock cycle for describing the operation of the variable-length encoding apparatus that employs the prior art;

FIG. 8 is a diagram illustrating part of a Table K.5; and

FIG. 9 is a diagram illustrating operation for every clock of the variable-length encoding apparatus shown in FIG. 7.

DETAILED DESCRIPTION OF THE

PREFERRED EMBODIMENTS

Preferred embodiments of the present invention will now be described in detail in accordance with the accompanying drawings.

[First Embodiment]

Figure 5:
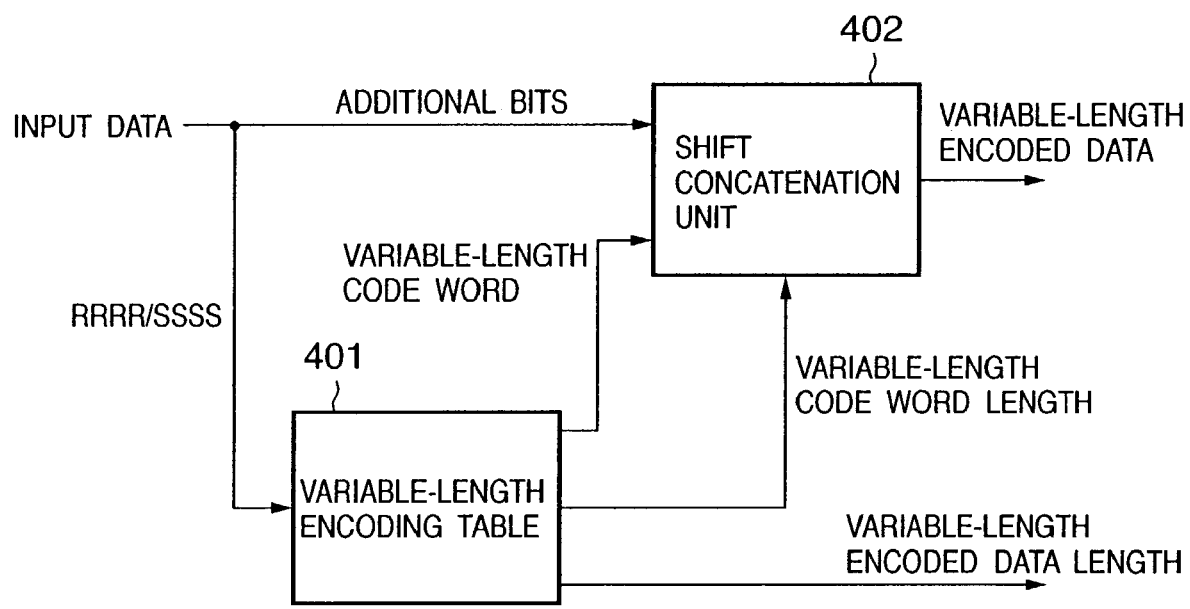
FIG. 5 is a block diagram illustrating an example of the structure of a variable-length encoding apparatus according to the prior art.

FIG. 5 illustrates an example of the structure of a variable-length encoding apparatus according to the prior art.

In a case where the apparatus is a variable-length encoding apparatus that supports JPEG encoding, for example, run length RRRR, category SSSS and additional bits are input simultaneously as input data. The RRRR/SSSS and additional bits are generated by constructing a category encoder, etc., on the input side of the variable-length encoding apparatus shown in FIG. 5. The category encoder converts quantized DCT coefficients that have been rearranged in the order of zigzag scanning to a category SSSS, additional bits and run length RRRR. The data (data to be encoded) that is input to the variable-length encoding apparatus of FIG. 5 is one set of RRRR/SSSS and additional bits. Here the set of RRRR/SSSS data shall be referred to as symbol data.

A variable-length encoding table 401 outputs a variable-length code word and the corresponding bit length of the code word using RRRR/SSSS, which is symbol data, as an index. A Huffman table generally is used as a table of the correspondence between symbol data and variable-length code words. The Huffman table is obtained by constructing a Huffman tree in such a manner that variable-length code words of short code-word length are assigned to symbol data having a high frequency of occurrence and variable-length code words of relatively long code-word length to symbol data having a low frequency of occurrence. The tree is constructed from statistical data that takes the frequency of occurrence of symbol data into consideration.

Examples of Huffman tables that can be mentioned are Tables K.3, K.4, K.5 and K.6 of Annex K of ISO/IEC 10918-1, CCIT Rec. T.81. FIG. 7 illustrates operation for every clock cycle for describing the operation of the variable-length encoding apparatus that employs the prior art. It is assumed here that the variable-length encoding table 401 is such that Table K.5 of Annex K of ISO/IEC 10918-1, CCIT Rec. T.81 is implemented in the form of a ROM memory. Further, part of Table K.5 is illustrated in FIG. 8. More specifically, variable-length code words corresponding to symbol data (RRRR/SSSS) can be obtained by referring to the table shown in FIG. 8.

Figure 6:
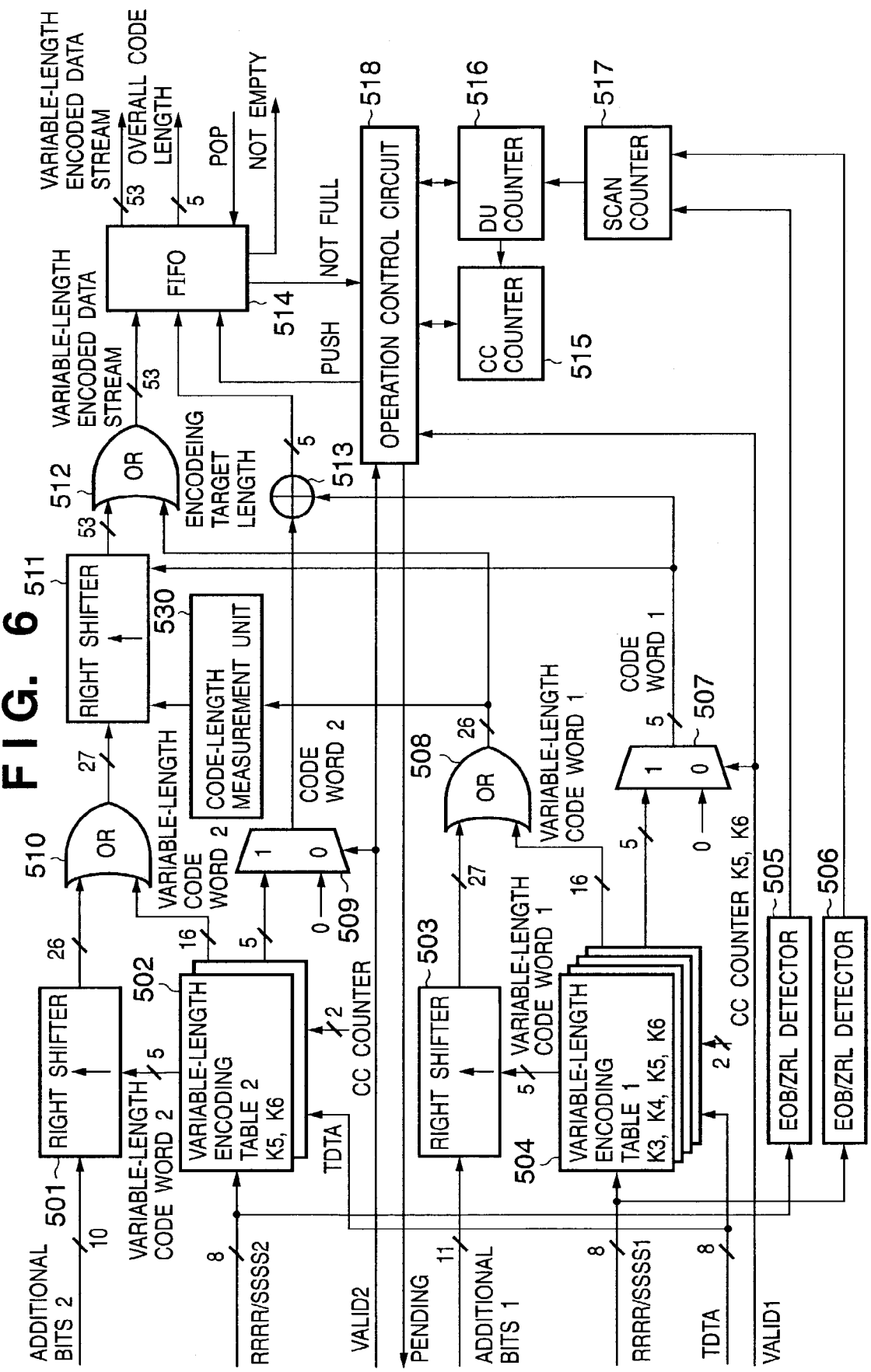
FIG. 6 is a diagram illustrating the basic structure of a variable-length encoding apparatus in a first embodiment of the present invention.

At clock cycle 1 in FIG. 6, symbol data 0/2 and additional bits "01" are input to the variable-length encoding apparatus of FIG. 5 simultaneously. As shown in FIG. 5, the symbol data (RRRR/SSSS) is input to the variable-length encoding table 401 and the additional bits to a shift concatenation unit 402. The variable-length encoding table 401 refers to the table shown in FIG. 8, outputs the variable-length code word "01" corresponding to the symbol data 0/2 and outputs the bit length "2" of this variable-length code word.

The variable-length encoding table 401 outputs the length of variable-length encoded data, which length is a combination of the length of the variable-length code word and the length of the additional bits. It goes without saying, however, that this may be found by adding the length of the variable-length code word that is output from the variable-length encoding table 401 and the value of SSSS of the entered symbol data.

The shift concatenation unit 402 shifts the entered additional bits rightward by a number of bits equivalent to the length of the variable-length code word that enters from the variable-length encoding table 401. The additional bits that has been shifted to the right is OR'ed with the variable-length code word that likewise enters from the variable-length encoding table 401, and the result is output as a variable-length encoded data stream. By repeating an operation similar to that of clock cycle 1 with regard to the clock cycles from cycle 2 onward, a series of variable-length encoded data streams is generated.

The variable-length encoding apparatus of this embodiment described below is an example of application to entropy encoding in the JPEG encoding scheme. Two items of symbol data in a continuous series can be input in parallel simultaneously, and the apparatus can generate and output a variable-length encoded data stream that is based upon each of the items of variable-length encoded data. The variable-length encoding apparatus and method according to this embodiment will now be described.

<Structure of the Variable-length Encoding Apparatus>

FIG. 6 is a diagram illustrating the basic structure of a variable-length encoding apparatus according to this embodiment. As mentioned above, the variable-length encoding apparatus shown in FIG. 6 is so adapted that two items of symbol data (RRRR/SSSS1, RRRR/SSSS2) can be entered in parallel simultaneously. However, it is not necessarily required that two items of symbol data always be input to this variable-length apparatus simultaneously, and the apparatus may be so adapted that only one of these two signals is input. This is achieved by having an external circuit, which is connected to the input side of this variable-length encoding apparatus, assert/negate signals VALID1 and VALID2, which are input signals of this variable-length encoding apparatus. In a case where the signal VALID1 has been asserted in the present clock cycle, the variable-length encoding apparatus judges that valid symbol data 1 is being input thereto. The same holds true with regard to the signal VALID2.

Further, according to this embodiment, Tables K.3, K.4, K.5 and K.6 of Annex K of ISO/IEC 10918-1, CCIT Rec. T.81 are used as the variable-length encoding tables. The K.3 and K.4 tables are Huffman tables with regard to DC coefficients. In this embodiment, it is assumed that DC coefficients are always entered as the symbol data 1 (RRRR/SSSS1). Tables other than these are Huffman tables for AC coefficients. According to this embodiment, it is assumed that AC coefficients also are always entered as symbol data.

Which Huffman tables are selected in a variable-length encoding table 502 and variable-length encoding table 504 is determined based upon a TDTA parameter input signal and value of a CC counter 515. The TDTA parameter signal corresponds to TDj, TAj parameters within a scan header in an JPEG code stream. These parameters indicate assignment of Huffman tables corresponding to each of the components. Furthermore, until variable-length encoding processing applied to a series of JPEG code data is completed, a change in the state of the TDTA parameter input signal is forbidden. The CC counter 515 is a 2-bit counter for obtaining a component number that is to be processed in the present clock cycle. A DU counter 516 is counted up whenever the final 8×8 DCT coefficient block is sensed by a scan counter 517. When the count has reached a number of data units that construct the component number to be processed at the present time, the DU counter 516 so notifies the CC counter 515. Upon being so notified, the CC counter 515 changes over the component to be processed.

Meanwhile, entered additional bits 1 and additional bits 2 are applied to right shifters 503 and 501, respectively, and the applied data is shifted rightward by numbers of bits corresponding to the lengths of variable-length code data that enter from respective ones of the variable-length encoding table 504 and variable-length encoding table 502. The right-shifted additional bits is input to respective ones of OR gates 508 and 510. The OR gates 508, 510 calculate the OR between these data signals and a variable-length code word 1 and variable-length code word 2 that enter from the variable-length encoding table 504 and variable-length encoding table 502, respectively.

The output of the OR gate 510 is input to a right shifter 511. Also input to the right shifter 511 is a bit count measured by a code-length measurement unit 530 (the bit count is the number of bits of the code length of variable-length code word 1 plus the number of bits of the additional bits 1). The shifter 511 shifts the output of the OR gate 510 rightward by the number of bits measured by the code-length measurement unit 530. An OR gate 512 calculates the OR between the output of the right shifter 511 and the output of the OR gate 508. As a result, the output of the OR gate 512 is a variable-length encoded data stream corresponding to symbol data 1 and symbol data 2. This data stream is stored in a FIFO 514.

Further, an external circuit connected to the output side of the variable-length encoding apparatus in this embodiment receives a signal NOT EMPTY, which is a signal indicating that valid variable-length encoded data is present in the FIFO 514. By discriminating this signal, this external circuit instructs this variable-length encoding apparatus, by way of a POP signal, whether or not to extract the variable-length encoded data stream.

Meanwhile, an operation control circuit 518 discriminates a signal NOT FULL, which indicates whether the FIFO 514 is full or not. If the signal NOT FULL has been negated, the operation control circuit 518 asserts a signal PENDING, which indicates that symbol data cannot be accepted in the present clock cycle. The signal PENDING is sent to the external circuit that is connected to the input side of this variable-length encoding apparatus.

<Operation of Variable-length Encoding Apparatus (Variable-length Encoding Method)>

The operation of the variable-length encoding apparatus having the above-mentioned structure according to this embodiment will now be described. In the description that follows, it will be assumed that the K.5 table (the Huffman table for AC coefficients) has been selected at the present time in the variable-length encoding table 504 and variable-length encoding table 502 based upon the TDTA signal and value in the CC counter 515 in this variable-length encoding apparatus. In other words, a variable-length code word corresponding to symbol data (RRRR/SSSS) can be obtained by referring to the table illustrated in FIG. 8.

FIG. 9 is a diagram illustrating operation for every clock cycle of this variable-length encoding apparatus. First, at clock cycle 1, the external circuit on the input side asserts the signals VALID1 and VALID2. This indicates that the valid items of symbol data RRRR/SSSS1 and RRRR/SSSS2 are being input to this variable-length encoding apparatus. Since the NOT FULL signal from FIFO 514 is being asserted, the operation control circuit 518 negates the PENDING signal, thereby notifying the external circuit that this variable-length encoding apparatus will not accept two items of symbol data in clock cycle 1. The operation control circuit 518 further asserts a PUSH signal, which is applied to the FIFO 514, to instruct the FIFO to load variable-length encoded data.

In clock cycle 1, "0/2", "1/9" are input to the variable-length encoding tables 504, 502 as symbol data RRRR/SSSS1, RRRR/SSSS2, respectively. These tables output variable-length code words corresponding to respective ones of the entered items of symbol data in accordance with the table shown in FIG. 8. According to the table illustrated in FIG. 8, the variable-length code word (variable-length code word 1) corresponding to "0/2" is "01" and the variable-length code word (variable-length code word 2) corresponding to "1/9" is "1111111110000111". The variable-length encoding tables 504 and 502 therefore output variable-length code words "01" and "1111111110000111", respectively.

Further, additional bits "01" and "111110101" that have been added onto the symbol data 0/2 and 1/9, respectively, are input to the right shifters 503 and 501, respectively, which proceed to shift these items of data rightward by the numbers of bits (2), (16) of the variable-length code words 1, 2, respectively. These are then concatenated with the shifted variable-length codes words 1, 2 by the OR gates 508, 510, respectively, whereby "0101", "1111111110000111111110101", respectively, are obtained. The right shifter 511 shifts the output of the OR gate 510 rightward by the number of output bits of the OR gate 508 measured by the code-length measurement unit 530 (the number of bits of variable-length code word 1 plus the number of bits of additional bits 1). That is, the output is shifted four bits to the right.

The OR gate 512 calculates the OR between the output of the right shifter 511 and the output of the OR gate 508 and outputs a variable-length encoded data stream "01011111111110000111111110101".

In clock cycle 2, signal VALID2 is being been enabled and the symbol data RRRR/SSSS2 is not being entered. In clock cycle 2, therefore, symbol data is not input to the variable-length encoding table 502 and symbol data RRRR/SSSS1 "0/A" is input to the variable-length encoding table 504. According to the table shown in FIG. 8, the variable-length code word 1 corresponding to symbol data RRRR/SSSS1 "0/A" is "1111111110000001", and therefore this variable-length word is output from the variable-length encoding table 504. Further, additional bits "0011100011" that has been added onto the symbol data 0/A is input to the right shifter 503, which proceeds to shift this data rightward by the number of bits (16) of the variable-length code word 1. This data is then concatenated with the shifted variable-length code word 1 by the OR gate 508, whereby "11111111100000010011100011" is obtained.

Since there is no output from the right shifter 511, the OR gate 512 delivers the output of the OR gate 508 as is.

In clock cycle 3, the FIFO 514 negates the NOT FULL signal, thereby indicating that variable-length encoded data cannot be accepted in the present clock cycle. In this case, the operation control circuit 518 asserts the PENDING signal sent to the external circuit on the input side, whereby the variable-length encoding apparatus reports that data will not be accepted even if the signal VALID1 or VALID2 is asserted.

In clock cycle 4, the external circuit on the input side continues to input the symbol data and additional bits entered in clock cycle 3. Since the PENDING signal has been negated, the variable-length encoding apparatus generates a variable-length encoded data stream and stores it in the FIFO 514 through a procedure similar to that of clock cycle 1.

In clock cycle 5, the external circuit on the input side negates the signals VALID1, VALID2 and therefore the operation control circuit 518 negates the PUSH signal applied to the FIFO 514, thereby instructing the same not to load the variable-length encoded data stream in this clock cycle.

In clock cycle 6, ZRL is input as the symbol data RRRR/SSSS1, where ZRL represents symbol data not accompanied by additional bits. When reference is had to the table shown in FIG. 8, therefore, it is found that the variable-length code word corresponding to ZRL is "11111111001". Accordingly, the outputs of the variable-length encoding table 504 and OR gate 508 both become "11111111001". From this point onward, an output is delivered to the FIFO 514 through a procedure similar to that of clock cycle 1.

In clock cycle 7, EOB, which is symbol data indicative of the final data of the DCT coefficient block, is input as the symbol data RRRR/SSSS2. Since the data EOB is symbol data that is not accompanied by additional bits, just as in the case of ZRL, it is found that the variable-length code word corresponding to EOB is "1010" by referring to the table shown in FIG. 8. The output of the OR gate 512, therefore, is "1010".

In accordance with the description rendered above, the variable-length encoding apparatus and method of this embodiment make it possible to process, at one time, multiple items of data to be encoded and to generate variable-length encoded data of these multiple items of data to be encoded. As a result, encoding processing can be executed at higher speed.

[Second Embodiment]

If the set of additional bits 1 and RRRR/SSSS1 is referred to as encoding target data 1 and the set of additional bits 2 and RRRR/SSSS2 is referred to as encoding target data 2 in the variable-length encoding apparatus shown in FIG. 6, then the portion that generates the variable-length encoded data of encoding target data 1 will be the right shifter 503, variable-length encoding table 504, OR gate 508 and a code-length generator 507. These four components shall be referred to collectively as a variable-length code generator 1. The variable-length code generator 1 obtains the bit length of the variable-length code word by a code-length generator 507 and outputs this bit length.

Similarly, the portion that generates the variable-length encoded data of encoding target data 2 will be the right shifter 501, variable-length encoding table 502, OR gate 510 and a code-length generator 507. These four components shall be referred to collectively as a variable-length code generator 2. The variable-length code generator 2 obtains the bit length of the variable-length code word by a code-length generator 509 and outputs this bit length.

Figure 2:
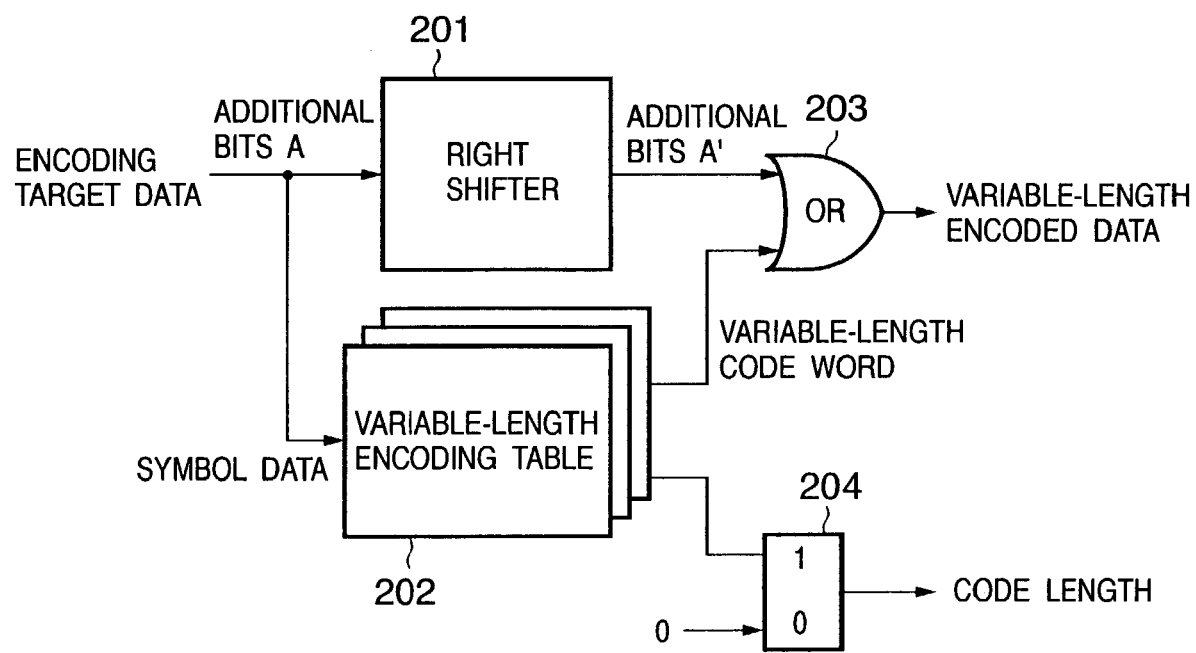
FIG. 2 is a diagram illustrating the structure of a variable-length code generator.

FIG. 2 illustrates the structure of the variable-length code generators. The variable-length code generator shown in FIG. 2 has additional bits A and symbol data included in encoding target data input thereto, concatenates additional bits A' (additional bits that has been shifted by a right shifter 201) and a variable-length code word to produce variable-length code data, and obtains the bit length of the variable-length code word.

Figure 3:
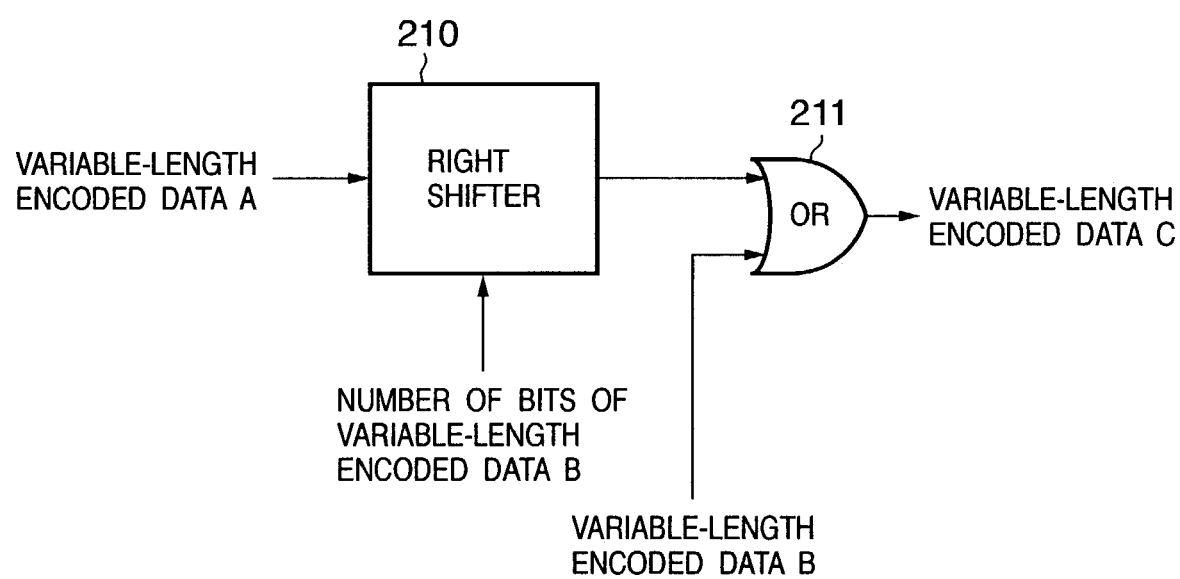
FIG. 3 is a diagram illustrating the structure of a concatenation unit.

The portion that concatenates the variable-length code data 1, 2 obtained by the variable-length code generators 1, 2 is constituted by the right shifter 511 and OR gate 512. These two components shall be referred to as a concatenation unit, the structure of which is illustrated in FIG. 3. Specifically, FIG. 3 illustrates the structure of a concatenation unit for concatenating variable-length code data A and variable-length code data B to produce variable-length code data C.

In the first embodiment, two items of encoding target data are input and variable-length encoded data is output using the variable-length code generators and concatenation unit. In the present embodiment, however, a variable-length encoding apparatus to which more than two items of encoding target data are input and variable-length encoded data is output by using the above-mentioned variable-length code generators and concatenation unit will be described.

Figure 1:
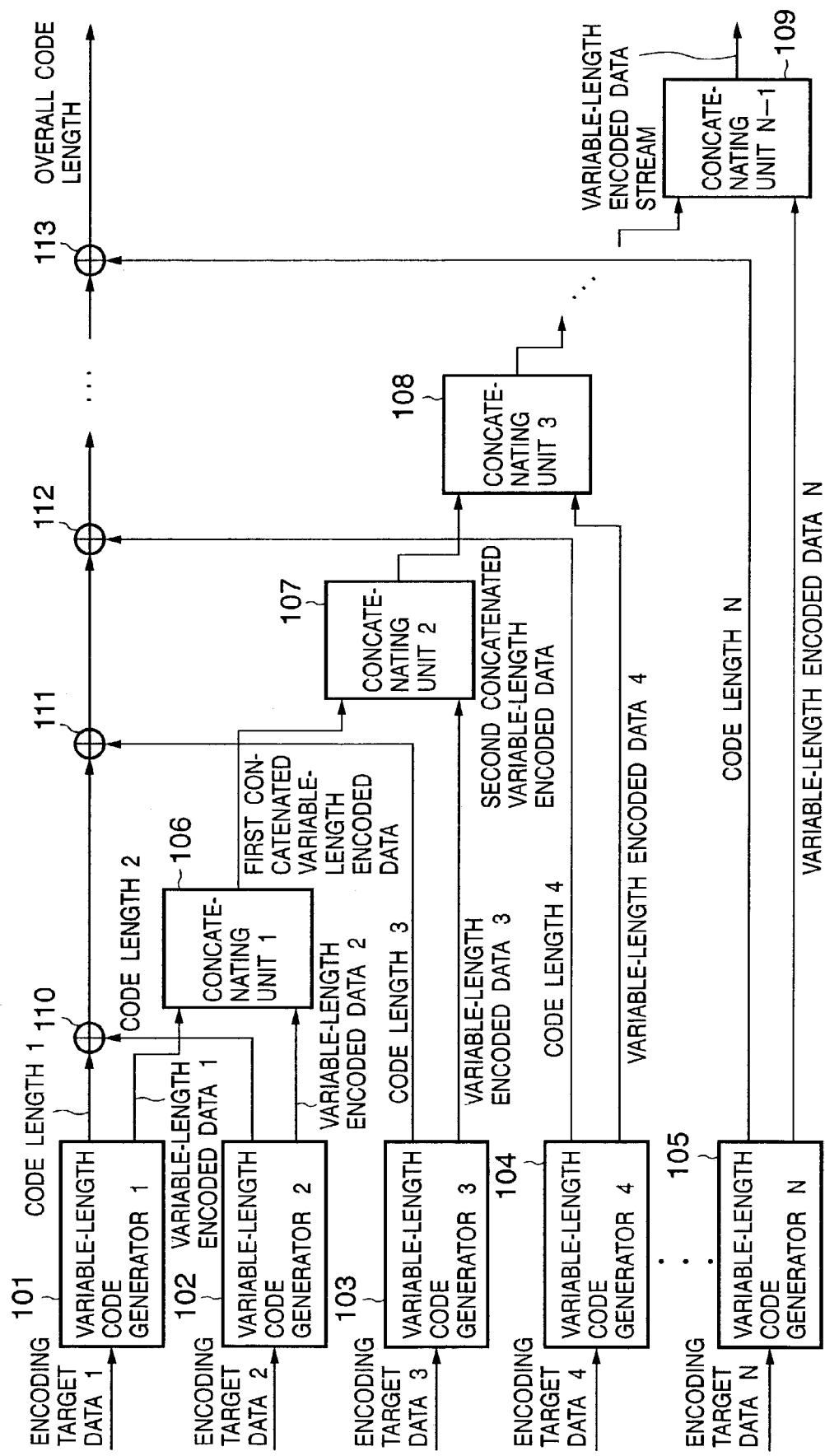
FIG. 1 is a block diagram illustrating the structure of a variable-length encoding apparatus having a first arrangement in a second embodiment of the present invention.

FIG. 1 is a block diagram illustrating the structure of a variable-length encoding apparatus having a first arrangement according to the second embodiment. The variable-length encoding apparatus of FIG. 1 uses a concatenating unit (1) 106 to concatenate variable-length encoded data produced by a variable-length code generator (1) 101 and variable-length encoded data produced by a variable-length code generator (2) 102. The variable-length encoded data thus concatenated is concatenated with variable-length encoded data from a variable-length code generator (3) 103 by a concatenating unit (2) 107. By executing this processing until variable-length encoded data from a variable-length code generator N is concatenated with the other concatenated data, the sought variable-length encoded data stream can eventually be obtained. Further, the bit lengths of the variable-length code words obtained by each of the variable-length code generators can be obtained by adding performed successively by adders 110, 111, 112 and 113.

Figure 4:
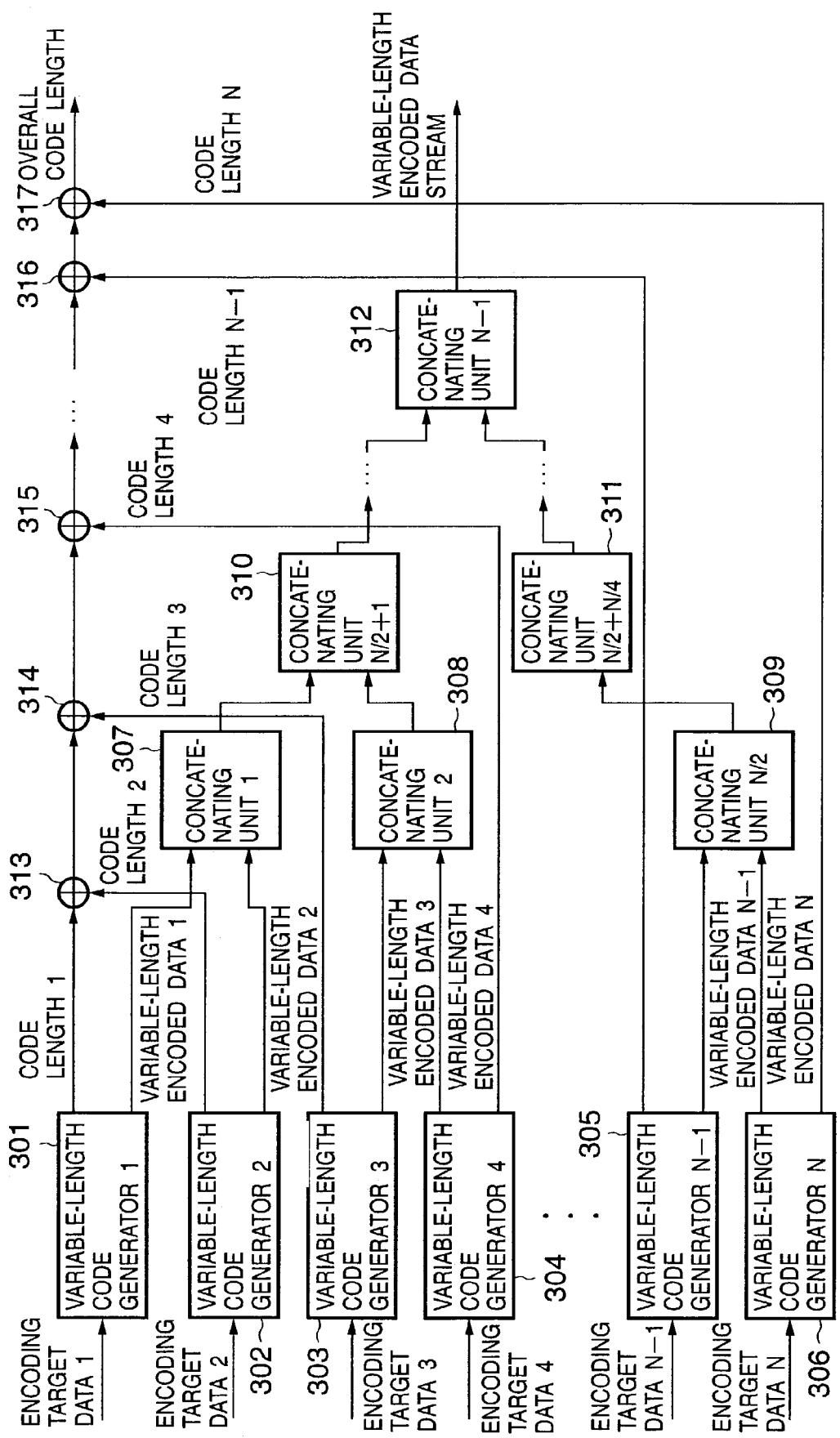
FIG. 4 is a block diagram illustrating the structure of a variable-length encoding apparatus having a second arrangement in a second embodiment of the present invention.

FIG. 4 is a block diagram illustrating the structure of a variable-length encoding apparatus having a second arrangement according to the second embodiment. The variable-length encoding apparatus of FIG. 4 uses a concatenating unit (1) 307 to concatenate variable-length encoded data produced by a variable-length code generator (1) 301 and variable-length encoded data produced by a variable-length code generator (2) 302. Further, a concatenating unit (2) 308 is used to concatenate variable-length encoded data produced by a variable-length code generator (3) and variable-length encoded data produced by a variable-length code generator (4). Thus, variable-length encoded data produced by a variable-length code generator m (m is an odd number and $1 \leq m \leq N-1$ holds) and variable-length encoded data produced by a variable-length code generator (m+1) are concatenated by a concatenating unit (m+1)/2. This processing is executed with respect to all m.

Next, as illustrated in FIG. 4, the outputs of contiguous concatenating units are concatenated successively and the sought variable-length encoded data stream can eventually be obtained by a concatenating unit 312 that finally concatenates all signals. Further, the bit lengths of the variable-length code words obtained by each of the variable-length code generators can be obtained by adding performed successively by adders 313, 314, 315, 316 and 317.

[Third Embodiment]

The first and second embodiments represent examples of a case where encoding target data is composed of additional bits and symbol data RRRR/SSSS. The JPEG encoding scheme typically is applicable to such data. In this embodiment, however, an example in which the present invention is applied to MPEG encoding will be described.

In MPEG encoding, the encoding target data is composed solely of RUN/LEVEL symbol data and does not contain additional bits except in cases where the encoding target data is a DC coefficient. In other words, only the structure of the variable-length code generators in the second embodiment differs from that of FIG. 2 and implementation is possible solely by processing for merely referring to an encoding table. With regard to the structure of the concatenation unit, on the other hand, an arrangement similar to that of FIG. 3 is permissible just as in the second embodiment.

Furthermore, the structure and processing procedure of the two variable-length code generators shown in FIGS. 2 and 4 illustrated as the second embodiment can be applied in similar fashion to the third embodiment.

[Fourth Embodiment]

Variable-length encoding is implemented by hardware in the above embodiments. However, a computer can be made to function as a variable-length encoding apparatus according to the above embodiments by having a program implement the functions of the components shown in FIGS. 1, 2, 3, 4 and 6 and having the computer read in and execute the program. It should be obvious that the program would fall within the scope of the claims of the present invention.

[Other Embodiments]

It goes without saying that the object of the invention is attained also by supplying a storage medium (or recording medium) on which the program codes of the software for performing the functions of the foregoing embodiments to a system or an apparatus have been recorded, reading the program codes with a computer (e.g., a CPU or MPU) of the system or apparatus from the storage medium, and then executing the program codes. In this case, the program codes read from the recording storage themselves implement the novel functions of the embodiments, and the program codes per se and storage medium storing the program codes constitute the invention. Further, besides the case where the aforesaid functions according to the embodiment are implemented by executing the program codes read by a computer, it goes without saying that the present invention covers a case where an operating system or the like running on the computer performs a part of or the entire process based upon the designation of program codes and implements the functions according to the embodiments.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process based upon the designation of program codes and implements the functions of the above embodiments.

Further, it goes without saying that implementation is possible also in a case where a motion vector is variable-length encoded as vector information in MPEG encoding, for example. In this case, variable-length code words stored in a variable-length encoding table need only be changed to those corresponding to motion vectors.

Furthermore, the present invention is not limited to a variable-length encoding apparatus for image data. It goes without saying that the present invention is applicable also to variable-length encoding processing in entropy encoding adopted in MPEG-1 Layer III, which is for audio encoding.

Thus, as described above, the present invention makes it possible to perform variable-length encoding at higher speed.

As many apparently widely different embodiments of the present invention can be made without departing from the spirit and scope thereof, it is to be understood that the invention is not limited to the specific embodiments thereof except as defined in the appended claims.

What is claimed is:

1. A variable-length encoding apparatus encoding two data groups in parallel, comprising:

an input unit adapted to input a first VALID signal and a second VALID signal for every clock cycle, wherein the first VALID signal indicates whether or not a first data group is input and the second VALID signal indicates whether or not a second data group is input;

a first encoding unit adapted to generate, when the first VALID signal indicates that the first data group is input, first variable-length encoding data by applying variable-length encoding to the first data group, and output the generated first variable-length encoding data and a number of bits of the first variable-length encoding data;

a second encoding unit adapted to generate, when the second VALID signal indicates that the second data group is input, second variable-length encoding data by applying variable-length encoding to the second data group, and output the generated second variable-length encoding data and a number of bits of the second variable-length encoding data;

a shift unit adapted to shift the second variable-length encoding data by the number of bits of the first variable-length encoding data; and a concatenation unit adapted to concatenate the first variable-length encoding data and the second variable-length encoding data by executing a logical OR of the first variable-length encoding data and the shifted second variable-length encoding data, wherein said concatenation unit outputs only the first variable-length encoding data without executing the concatenating processing, when the second VALID signal indicates that the second data group is not input.

2. The apparatus according to claim 1, wherein the first data group comprises first symbol data and first additional bit data, and the second data group comprises second symbol data and second additional bit data.

3. The apparatus according to claim 2, wherein each of the first symbol data and the second symbol data is combination data of run length and category.

4. The apparatus according to claim 2, wherein said first encoding unit comprises:

a unit adapted to adapted to generate first partial encoding data by applying variable-length encoding to the first symbol data, and output the generated first partial encoding data and a number of bits of the first partial encoding data;

a unit adapted to shift the first additional bit data by the number of bits of the first partial encoding data; and a unit adapted to concatenate the first partial encoding data and the first additional bit data by executing a logical OR of the first partial encoding data and the shifted first additional bit data, and said second encoding unit comprises:

a unit adapted to adapted to generate second partial encoding data by applying variable-length encoding to the second symbol data, and output the generated second partial encoding data and a number of bits of the second partial encoding data;

a unit adapted to shift the second additional bit data by the number of bits of the second partial encoding data; and a unit adapted to concatenate the second partial encoding data and the second additional bit data by executing a logical OR of the second partial encoding data and the shifted second additional bit data.

5. A variable-length encoding method encoding two data groups in parallel, comprising:

an input step of inputting a first VALID signal and a second VALID signal for every clock cycle, wherein the first VALID signal indicates whether or not a first data group is input and the second VALID signal indicates whether or not a second data group is input;

a first encoding step of generating, when the first VALID signal indicates that the first data group is input, first variable-length encoding data by applying variable-length encoding to the first data group, and outputting the generated first variable-length encoding data and a number of bits of the first variable-length encoding data;

a second encoding step of generating, when the second VALID signal indicates that the second data group is input, second variable-length encoding data by applying variable-length encoding to the second data group, and outputting the generated second variable-length encoding data and a number of bits of the second variable-length encoding data;

a shift step of shifting the second variable-length encoding data by the number of bits of the first variable-length encoding data; and a concatenation step of concatenating the first variable-length encoding data and the second variable-length encoding data by executing a logical OR of the first variable-length encoding data and the shifted second variable-length encoding data, wherein said concatenation step includes outputting only the first variable-length encoding data without executing the concatenating processing, when the second VALID signal indicates that the second data group is not input.

6. A computer program stored in a computer-readable medium which, when executed, performs a variable-length encoding method for encoding two data groups in parallel, the program comprising:

code for an input step of inputting a first VALID signal and a second VALID signal for every clock cycle, wherein the first VALID signal indicates whether or not a first data group is input and the second VALID signal indicates whether or not a second data group is input;

code for a first encoding step of generating, when the first VALID signal indicates that the first data group is input, first variable-length encoding data by applying variable-length encoding to the first data group, and outputting the generated first variable-length encoding data and a number of bits of the first variable-length encoding data;

code for a second encoding step of generating, when the second VALID signal indicates that the second data group is input, second variable-length encoding data by applying variable-length encoding to the second data group, and outputting the generated second variable-length encoding data and a number of bits of the second variable-length encoding data;

code for a shift step of shifting the second variable-length encoding data by the number of bits of the first variable-length encoding data; and code for a concatenation step of concatenating the first variable-length encoding data and the second variable-length encoding data by executing a logical OR of the first variable-length encoding data and the shifted second variable-length encoding data, wherein said code for a concatenation step includes code for outputting only the first variable-length encoding data without executing the concatenating processing, when the second VALID signal indicates that the second data group is not input.

* * * * *

UNITED STATES PATENT AND TRADEMARK OFFICE
CERTIFICATE OF CORRECTION

| | | |
|---|---|---|
| PATENT NO. | : 7,218,677 B2 | |
| APPLICATION NO. | : 10/443960 | |
| DATED | : May 15, 2007 | |
| INVENTOR(S) | : Katsumi Otsuka | |

It is certified that error appears in the above-identified patent and that said Letters Patent is hereby corrected as shown below:

COLUMN 1:

Line 36, "ing" should read --ing are--.

COLUMN 2:

Line 64, "clock" should read --clock cycle--.

COLUMN 4:

Line 1, "has" should read --have-- and "is" should read --are--; and
    Line 50, "an" should read --a--.

COLUMN 5:

Line 3, "is" should read --are--.

COLUMN 6:

Line 31, "been" should be deleted; and
    Line 41, "has" should read --have-- and "is" should read --are--.

COLUMN 7:

Line 54, "has" should read --have--.

UNITED STATES PATENT AND TRADEMARK OFFICE
CERTIFICATE OF CORRECTION

PATENT NO.      : 7,218,677 B2
APPLICATION NO. : 10/443960
DATED           : May 15, 2007
INVENTOR(S)     : Katsumi Otsuka It is certified that error appears in the above-identified patent and that said Letters Patent is hereby corrected as shown below:

<u>COLUMN 10</u>:

Line 41, "adapted to" (second occurrence) should be deleted; and
Line 53, "adapted to" (second occurrence) should be deleted.

Signed and Sealed this

Ninth Day of September, 2008

JON W. DUDAS
*Director of the United States Patent and Trademark Office*